United States Patent
MacMahan

(10) Patent No.: US 8,812,389 B2
(45) Date of Patent: Aug. 19, 2014

(54) SYSTEM AND METHOD OF LISTING AND DIVIDING ASSETS BETWEEN TWO OR MORE PARTIES

(76) Inventor: David MacMahan, Somis, CA (US)

(*) Notice: Subject to any disclaimer, the term of this patent is extended or adjusted under 35 U.S.C. 154(b) by 149 days.

(21) Appl. No.: 13/156,309

(22) Filed: Jun. 8, 2011

(65) Prior Publication Data
US 2011/0302071 A1 Dec. 8, 2011

Related U.S. Application Data

(60) Provisional application No. 61/352,766, filed on Jun. 8, 2010.

(51) Int. Cl.
*G06Q 40/00* (2012.01)

(52) U.S. Cl.
USPC .......................... 705/36 R; 705/35

(58) Field of Classification Search
USPC .......................................................... 705/38
See application file for complete search history.

(56) References Cited

U.S. PATENT DOCUMENTS

| | | | | |
|---|---|---|---|---|
| 6,161,099 A * | 12/2000 | Harrington et al. | ......... | 705/36 R |
| 6,505,174 B1 * | 1/2003 | Keiser et al. | ................. | 705/36 R |
| 6,671,674 B1 * | 12/2003 | Anderson et al. | ............ | 705/26.3 |
| 7,136,833 B1 * | 11/2006 | Podsiadlo | ........................ | 705/37 |
| 7,216,103 B2 * | 5/2007 | Friedland et al. | ............... | 705/37 |
| 7,225,152 B2 * | 5/2007 | Atkinson et al. | ................ | 705/37 |
| 7,315,840 B1 * | 1/2008 | Keith | ............................. | 705/37 |
| 7,487,124 B2 * | 2/2009 | Boutilier | ......................... | 705/37 |
| 7,720,743 B1 * | 5/2010 | Marks | ............................. | 705/37 |
| 7,729,950 B2 * | 6/2010 | Mendizabal et al. | ......... | 705/26.3 |
| 7,844,540 B2 * | 11/2010 | Boutilier | ......................... | 705/37 |
| 2001/0051940 A1 * | 12/2001 | Soulanille | ........................ | 707/3 |
| 2002/0116215 A1 * | 8/2002 | Lawrence et al. | ................. | 705/1 |
| 2002/0174060 A1 * | 11/2002 | Friedland et al. | ............... | 705/37 |
| 2003/0078873 A1 * | 4/2003 | Cohen | ............................ | 705/37 |
| 2003/0225680 A1 * | 12/2003 | Desmond | ........................ | 705/37 |
| 2004/0010461 A1 * | 1/2004 | Boutilier | ......................... | 705/37 |
| 2004/0133503 A1 * | 7/2004 | Podsiadlo | ........................ | 705/37 |
| 2005/0044032 A1 * | 2/2005 | Lee et al. | ......................... | 705/37 |
| 2006/0190392 A1 * | 8/2006 | Samid | ............................ | 705/37 |
| 2008/0270290 A1 * | 10/2008 | Harrington et al. | ............ | 705/37 |
| 2008/0294544 A1 * | 11/2008 | Harrington et al. | ............ | 705/37 |
| 2009/0030835 A1 * | 1/2009 | Burns et al. | ...................... | 705/37 |
| 2009/0112750 A1 * | 4/2009 | Boutilier | ......................... | 705/37 |
| 2010/0198658 A1 * | 8/2010 | Marks | ............................. | 705/10 |
| 2011/0302071 A1 * | 12/2011 | MacMahan | ...................... | 705/37 |
| 2012/0123893 A1 * | 5/2012 | Levin et al. | ................... | 705/26.3 |
| 2013/0013443 A1 * | 1/2013 | Christie | ....................... | 705/26.4 |

* cited by examiner

*Primary Examiner* — Kirsten Apple
(74) *Attorney, Agent, or Firm* — Kafantaris Law Offices; Theo Kafantaris

(57) ABSTRACT

The present invention comprises a system and method for dividing assets in an estate. First, the assets of the estate are populated in a catalog. A survey is distributed to all parties to gain pertinent information relating to their interests in the estate. The system will incorporate the party's intent when determining a course of action for division of assets. The system will gather the party's interest in items, establish an agreed monetary value for all items, receive bids for items based on emotional interest, offer parties the opportunity to bid on items with real currency, and finally divide remaining assets by means of selection. The parties will have the opportunity to barter their items with each other. If a party has received more than their fair share of the estate, they must pay the balance to the estate.

13 Claims, 13 Drawing Sheets

SYSTEM AND METHOD OF LISTING AND DIVIDING ASSETS BETWEEN TWO OR MORE PARTIES

CROSS-REFERENCE TO RELATED APPLICATIONS

This application claims the benefit of U.S. Provisional Patent Application No. 61/352,766, filed on Jun. 8, 2010, and incorporated herein by reference.

STATEMENT REGARDING FEDERALLY SPONSORED RESEARCH AND DEVELOPMENT

Not Applicable.

FIELD OF THE INVENTION

This invention relates to division of assets, and more particularly, to an online system for dividing assets arising from divorce, downsizing, and estates by utilizing monetary and emotional values.

DISCUSSION OF RELATED ART

Division and distribution of assets may come through divorce, downsizing of a home, division of an estate among heirs, or through any other means. Often, the parties are left with the challenge of dividing and distributing the assets among themselves. This task is further complicated when the parties are separated by thousands of miles with limited access to the property or without adequate communication with each other. When the parties cannot agree, a judicial decree may be required to distribute or divide the assets.

Often, the details of how to distribute assets with strong emotional attachment are left unspecified in a will. These assets are often described in a line such as: " . . . and all remaining unnamed items to be divided equally among the heirs." An opportunity for families to heal and support one another, after a loved one's life passes, often becomes marred in ugly emotional disputes that polarize the remaining family members. The heir or family friend named as executor is often thrust into an area fraught with challenges while having no experience from which to move forward.

Online resources can help to divide the property and encourage communication between the parties. Typical online asset division systems will assign monetary values to each asset and divide the property according to this value. When dealing with valuable assets, such as real property, current online asset division systems will separate the property according to the individual share accorded to each party.

While current online asset division systems provide a monetary system to divide property, they do not consider other factors, such as emotional attachment and sentimental value, which oftentimes can be the most important factor. Therefore, there is a need for a system that can distribute property fairly and evenly, while incorporating a unique valuation system that includes monetary and emotional values. The present invention accomplishes these objectives.

SUMMARY OF THE INVENTION

The present invention is a system that can distribute property fairly, evenly, and envy-free, while incorporating a unique valuation system that includes monetary and emotional values. Further, the present invention is implemented online, allowing the users to access the system from any location in the world.

The present invention process provides a system in which two or more intended recipients, or Devisees, of equitable rights to assets (things of monetary value, emotional value, or points of contention) will have a streamlined, flexible, and tailored process to achieve equitable distribution. The system facilitates cataloging, tagging photos, assignment of monetary and emotional values by the devisees involved, selection, and ultimately, equitable distribution. This process provides a combination of valuation and selection methods allowing the parties to assign, or bid, an Emotional Currency Value (EV) to items they would prefer to receive from the list. The EV in most scenarios is revealed only to the owner, so that the other "opposing" parties cannot be certain which items are most desirous. This method is often called "blind bidding."

The Perceived Monetary Value (MV) is simply the monetary value each believes the various items to be worth, which may vary among the parties. They may be based on "market" or "replacement value" and the parties involved may not agree on which it should be. A third party, such as an appraiser or estate auctioneer, may be used to set the MV (recommended) or create a base level MV assignment for the items. Easy access and submission to an online appraisal is also planned for the service.

One or more rounds of silent valuing of the items may be done to set a final MV, or final agreed MV, before beginning the Emotional Values (EVs) being placed by each party. If there isn't agreement on the base MV value, this process may be an extended time period to give the parties time to get an idea of fair market values if unsure. Cars, artwork and jewelry are examples of items with wide swings in perceived value. Alternately, depending on the survey responses of the Devisees, EV values may be requested of all parties to determine which of the items is of any interest to the parties and which should be sold or donated.

The starting MV value may begin at $1 so that items of no monetary value can be distributed. For example, holiday visitation, the starting year in custody conflicts, dividing a group of items with no significant monetary value, or assets having only emotional value to the parties. Initial rounds assigning EV (Emotional Value) by the parties will most effectively be hidden, or sealed, bids by each party. Later rounds may be hidden, or may follow more traditional auctioning, rotating selections, random assignments, or other dividing paths to complete the list assignments.

The present invention is designed to remove, or greatly reduce, the conflict and intense emotional charges from distributing even the smallest estates to the largest, in downsizing, death or divorce. It might serve to divide some very sentimentally valued (EV) paintings done by the deceased in an art class, a harmonica, a tie, golf clubs, a guitar, a pipe or family bible among surviving siblings, children and parents of a (son, sibling and father) who dies early in life. It can just as easily serve to divide an estate of assets worth millions in monetary value (MV) with collectible cars and valuable paintings in dispute. Or, it may be used to assign weekend or summer weeks for a shared ownership vacation home. The process and potential emotional charges are similar.

Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
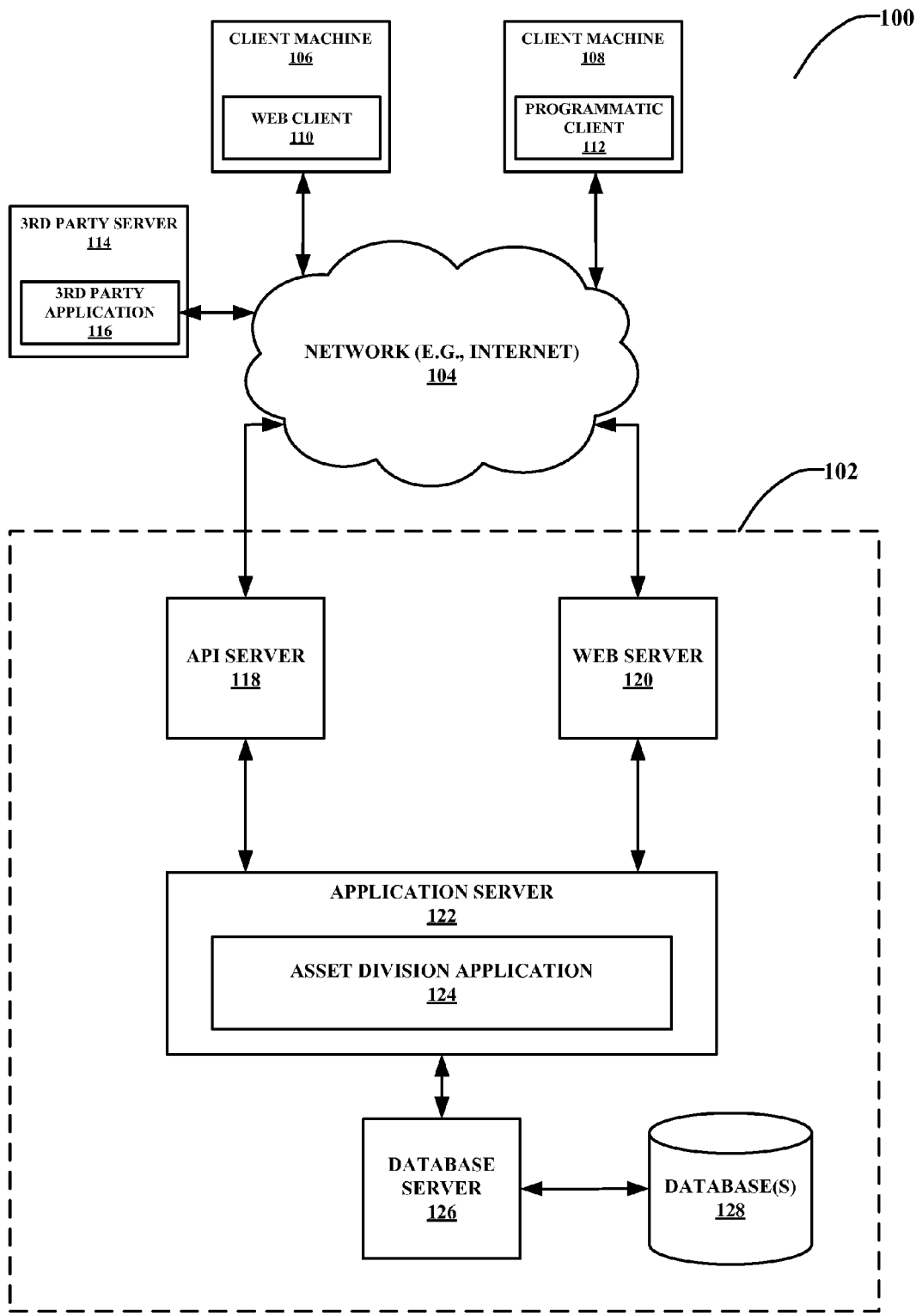
FIG. 1 is a diagram schematically illustrating a network wherein the application server and client machines are connected.
Figure 2A:
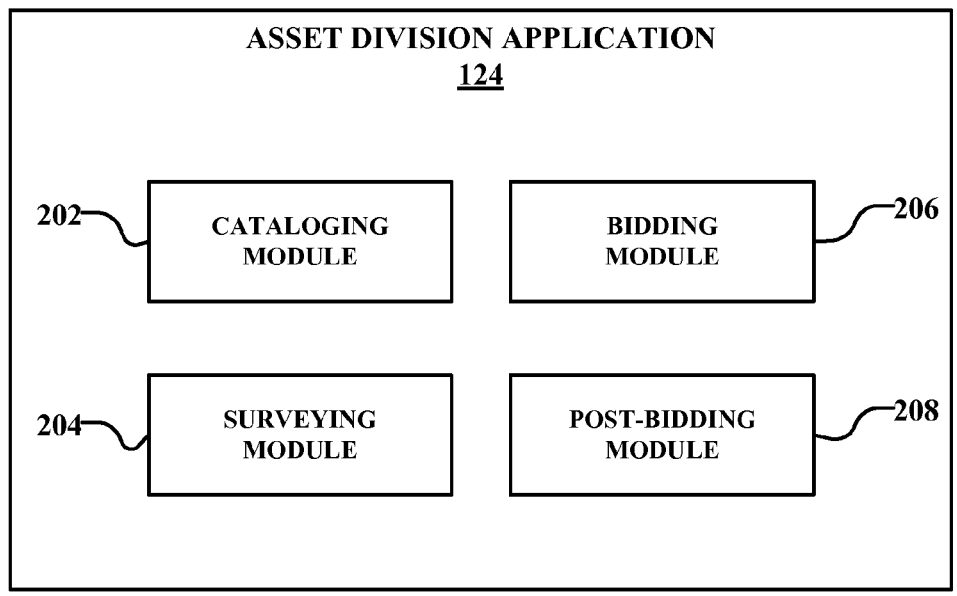
FIG. 2A is a diagram schematically illustrating the asset division application.
Figure 2B:
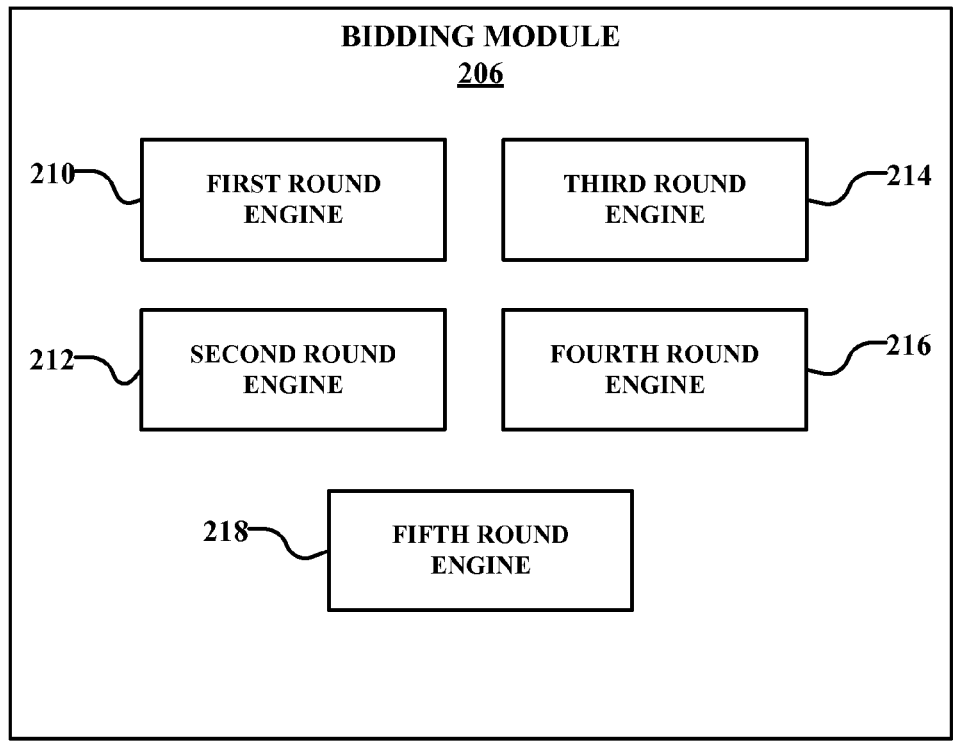
FIG. 2B is a diagram schematically illustrating the engines of the bidding module.
Figure 3:
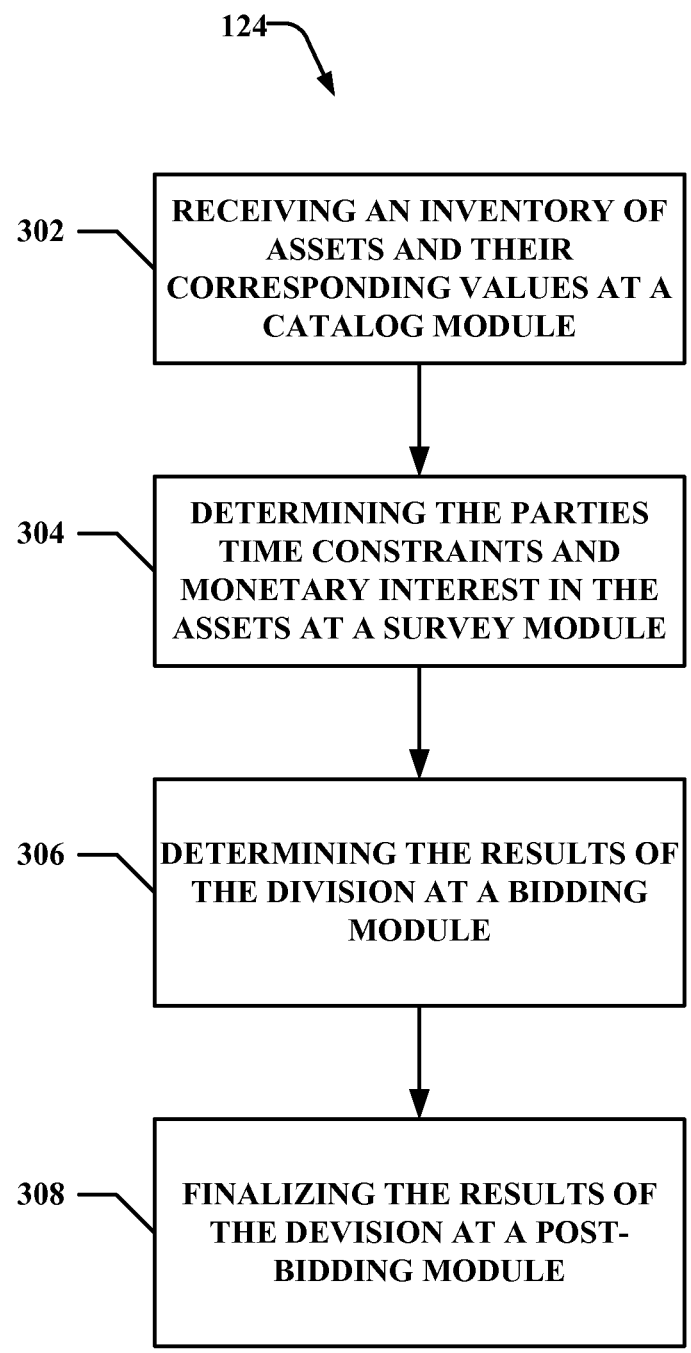
FIG. 3 is a flowchart illustrating the asset division application.
Figure 4:
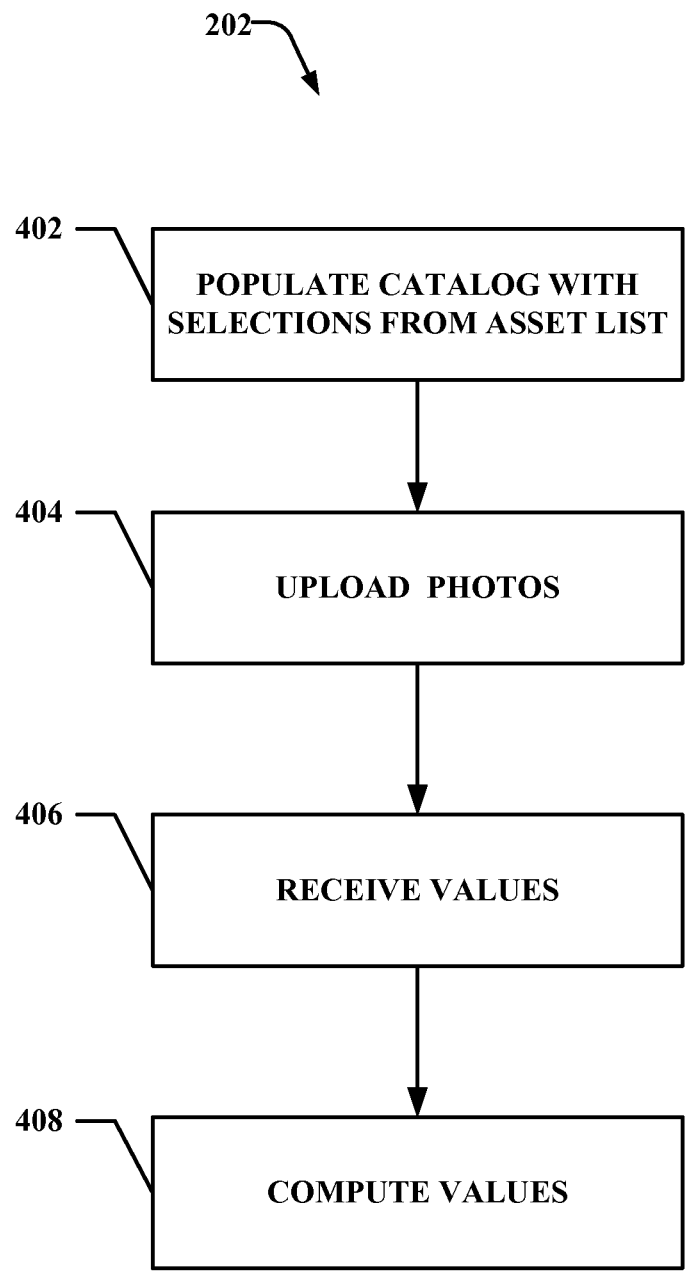
FIG. 4 is a flowchart illustrating the catalog module.
Figure 5:
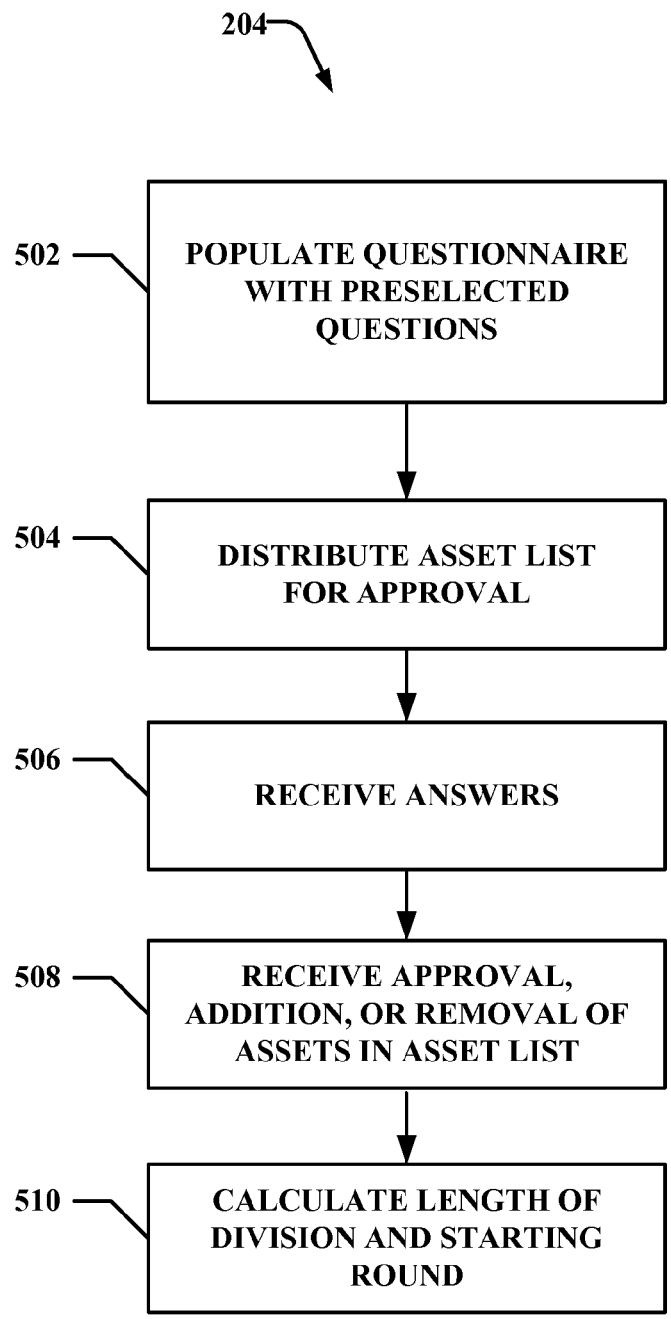
FIG. 5 is a flowchart illustrating the survey module.
Figure 6:
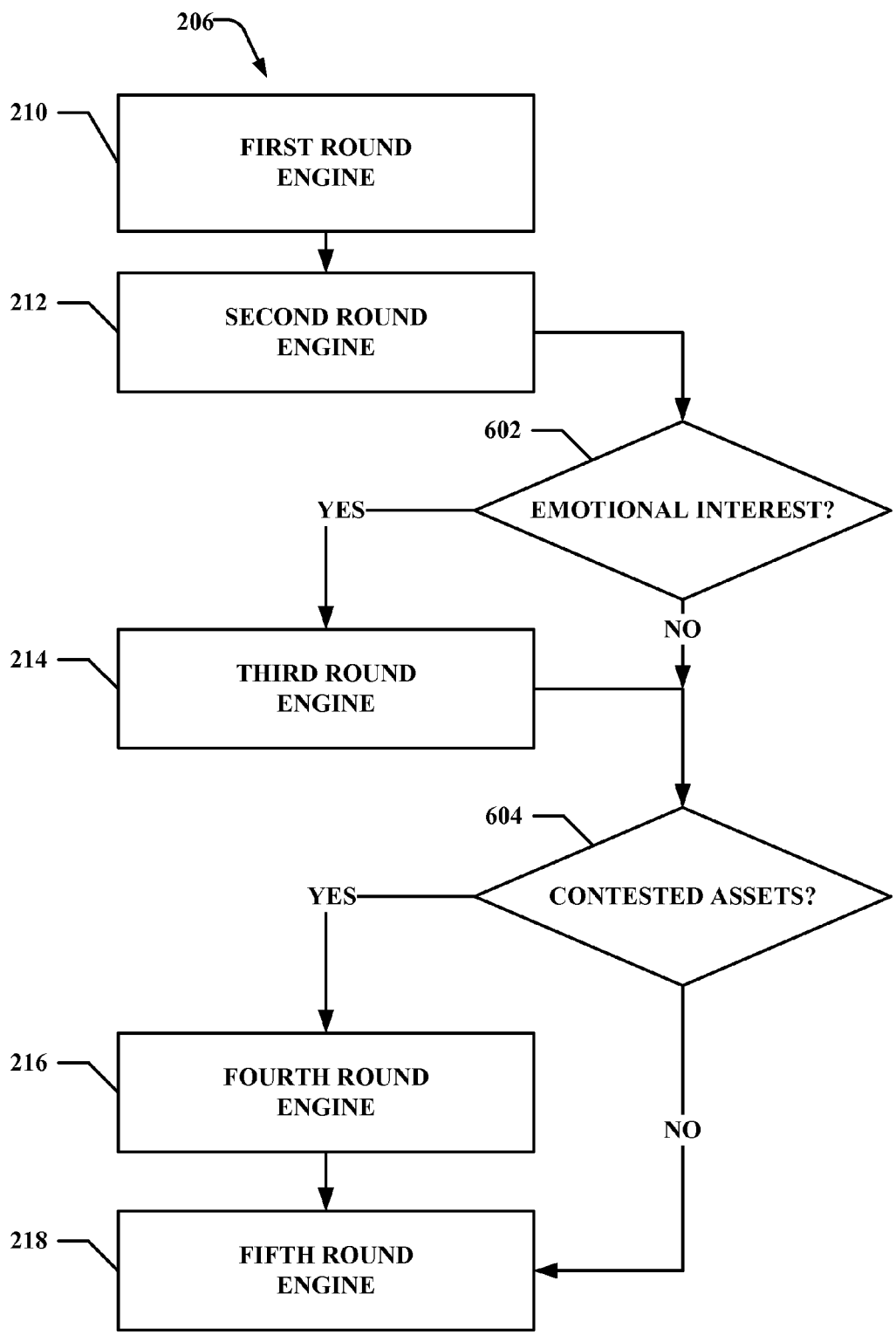
FIG. 6 is a flowchart of the bidding module.
Figure 7:
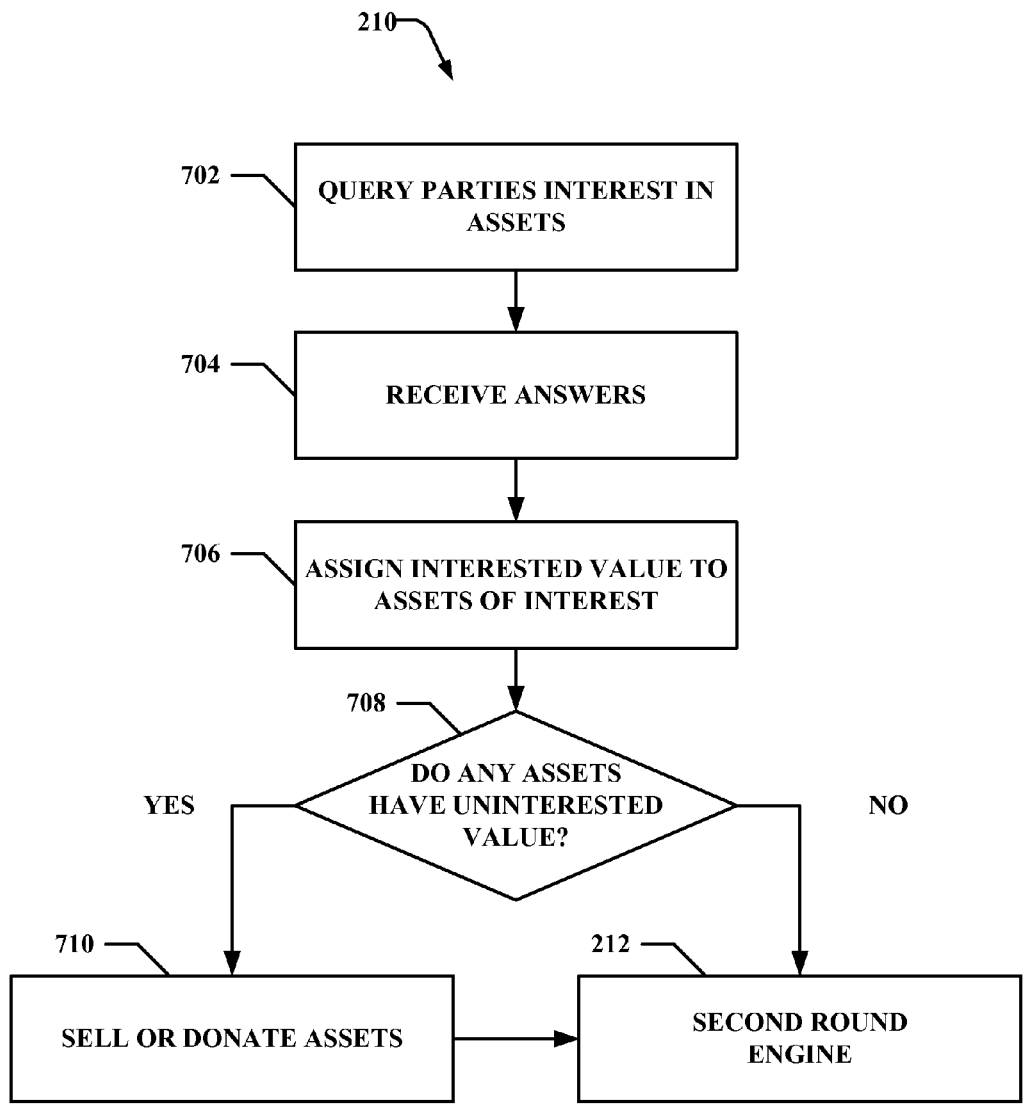
FIG. 7 is a flowchart illustrating the first round engine of the bidding module.
Figure 8:
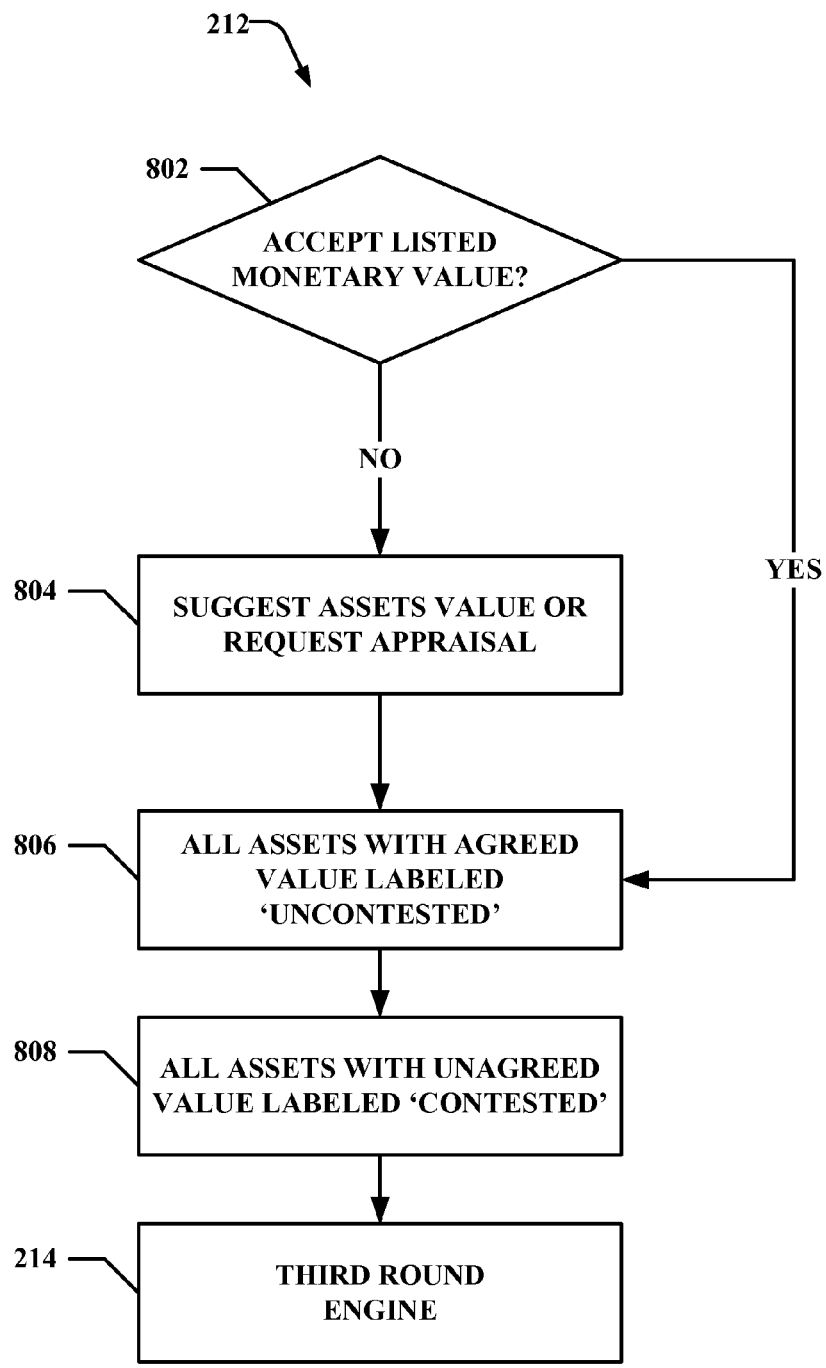
FIG. 8 is a flowchart illustrating the second round engine of the bidding module.
Figure 9:
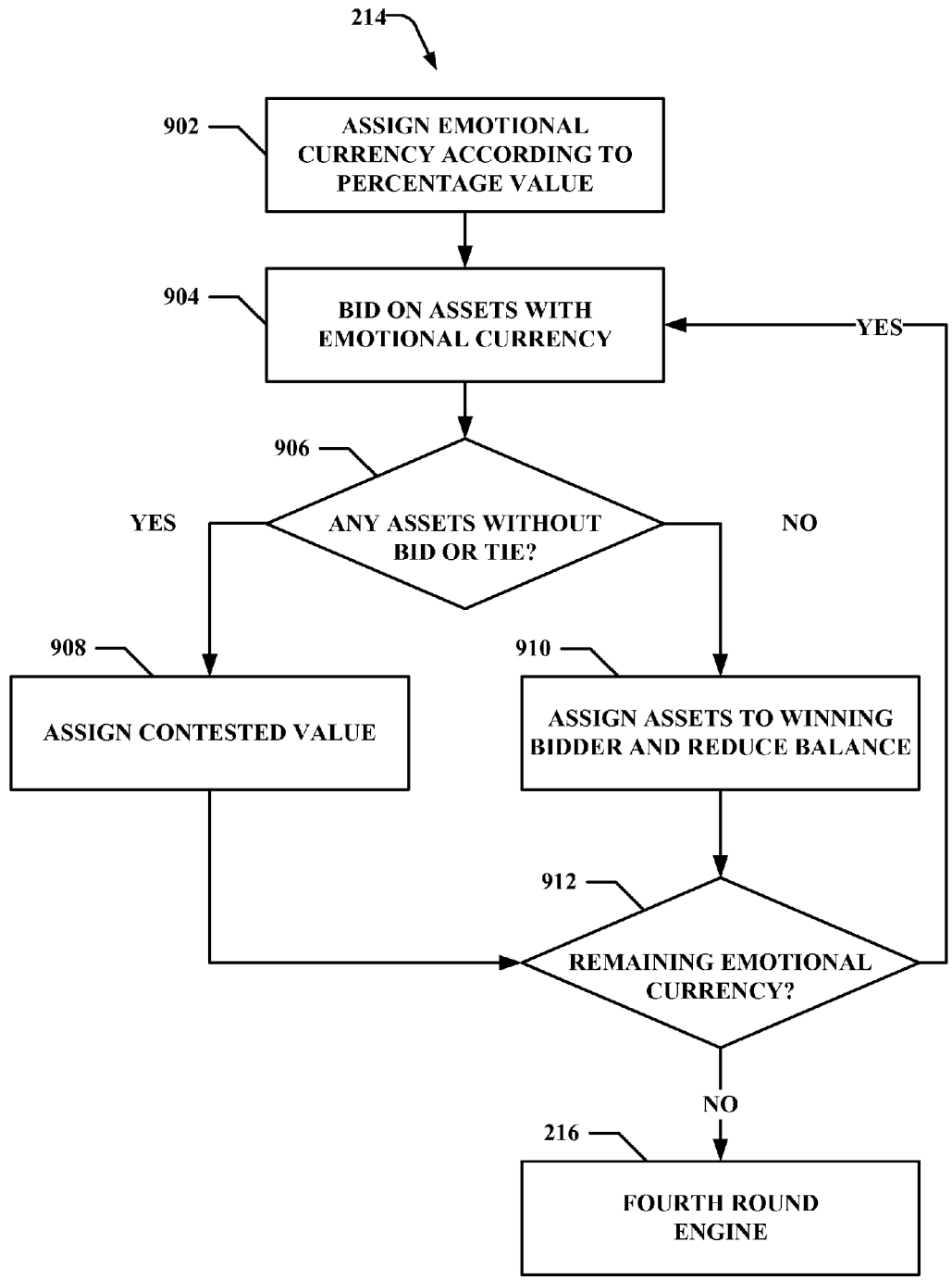
FIG. 9 is a flowchart illustrating the third round engine of the bidding module.
Figure 10:
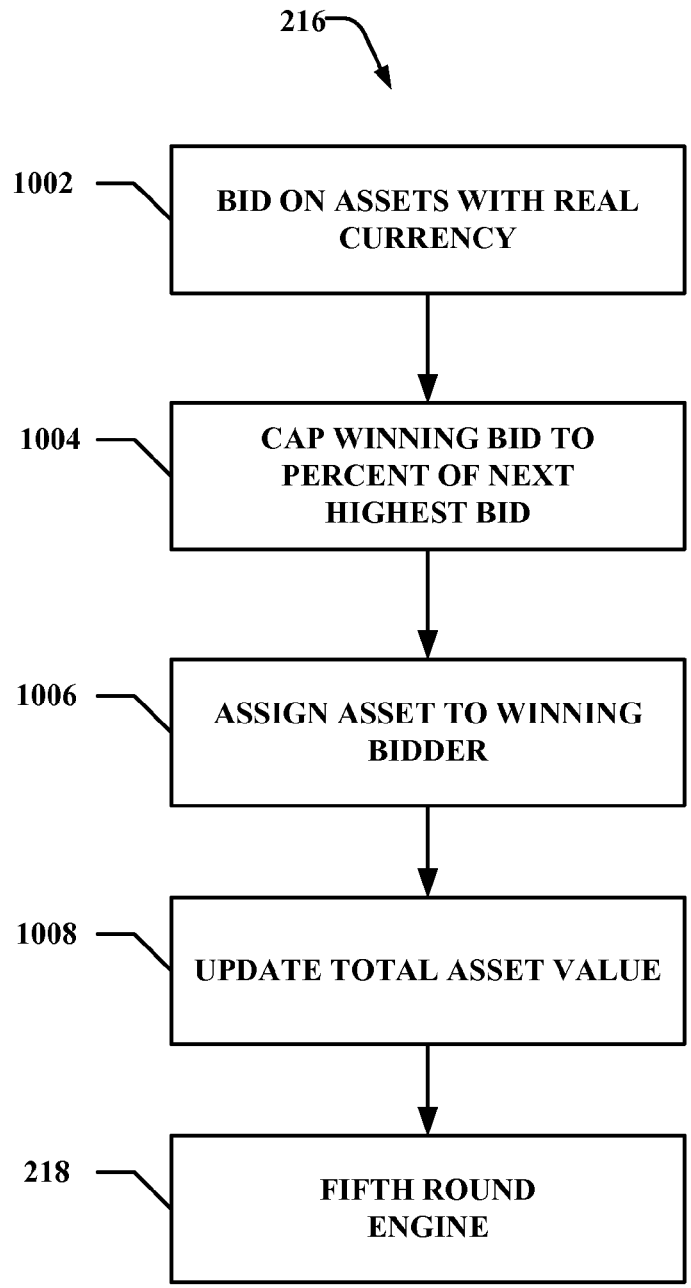
FIG. 10 is a flowchart illustrating the fourth round engine of the bidding module.
Figure 11:
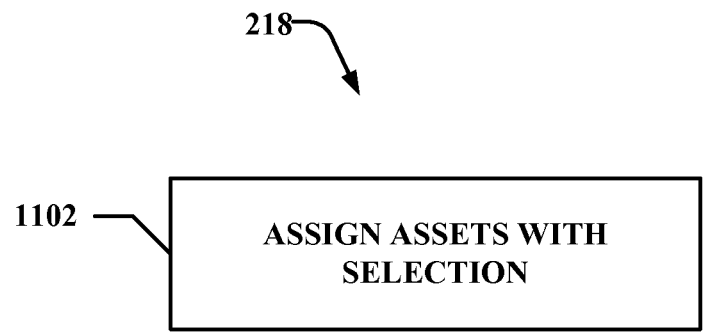
FIG. 11 is a flowchart illustrating the fifth round engine of the bidding module.
Figure 12:
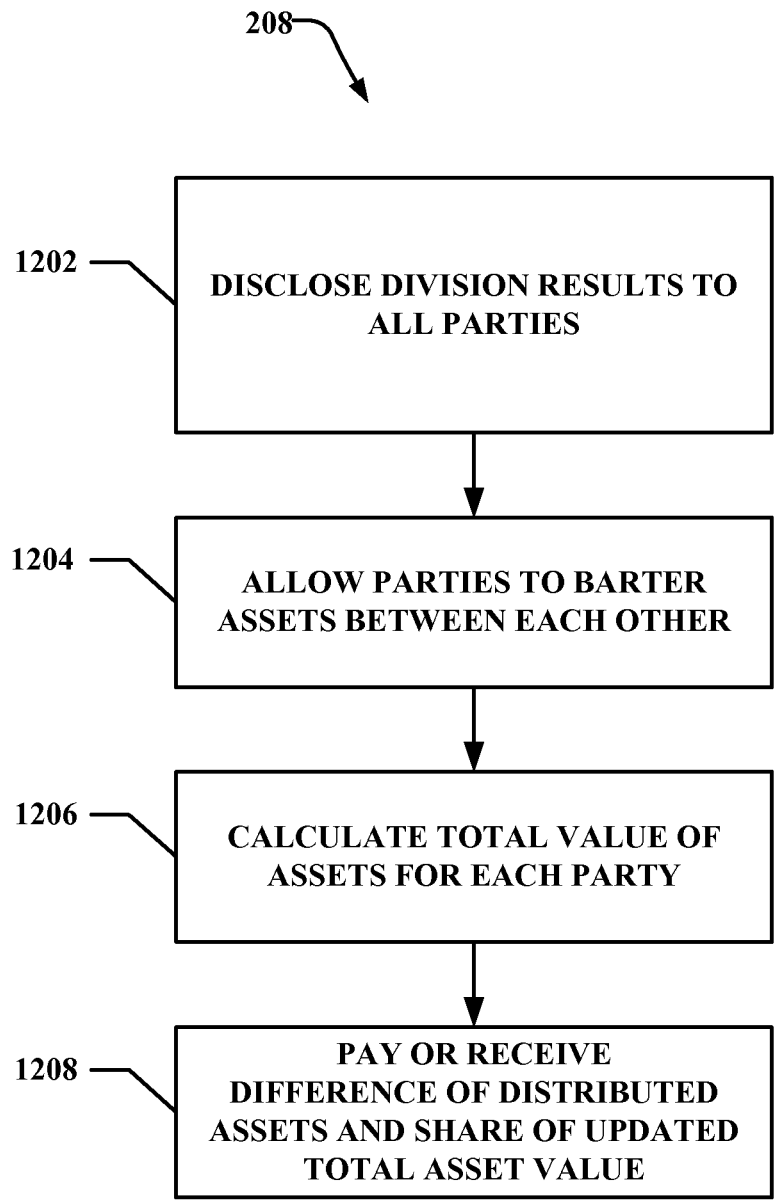
FIG. 12 is a flowchart illustrating the post-bidding module.
Figure 13:
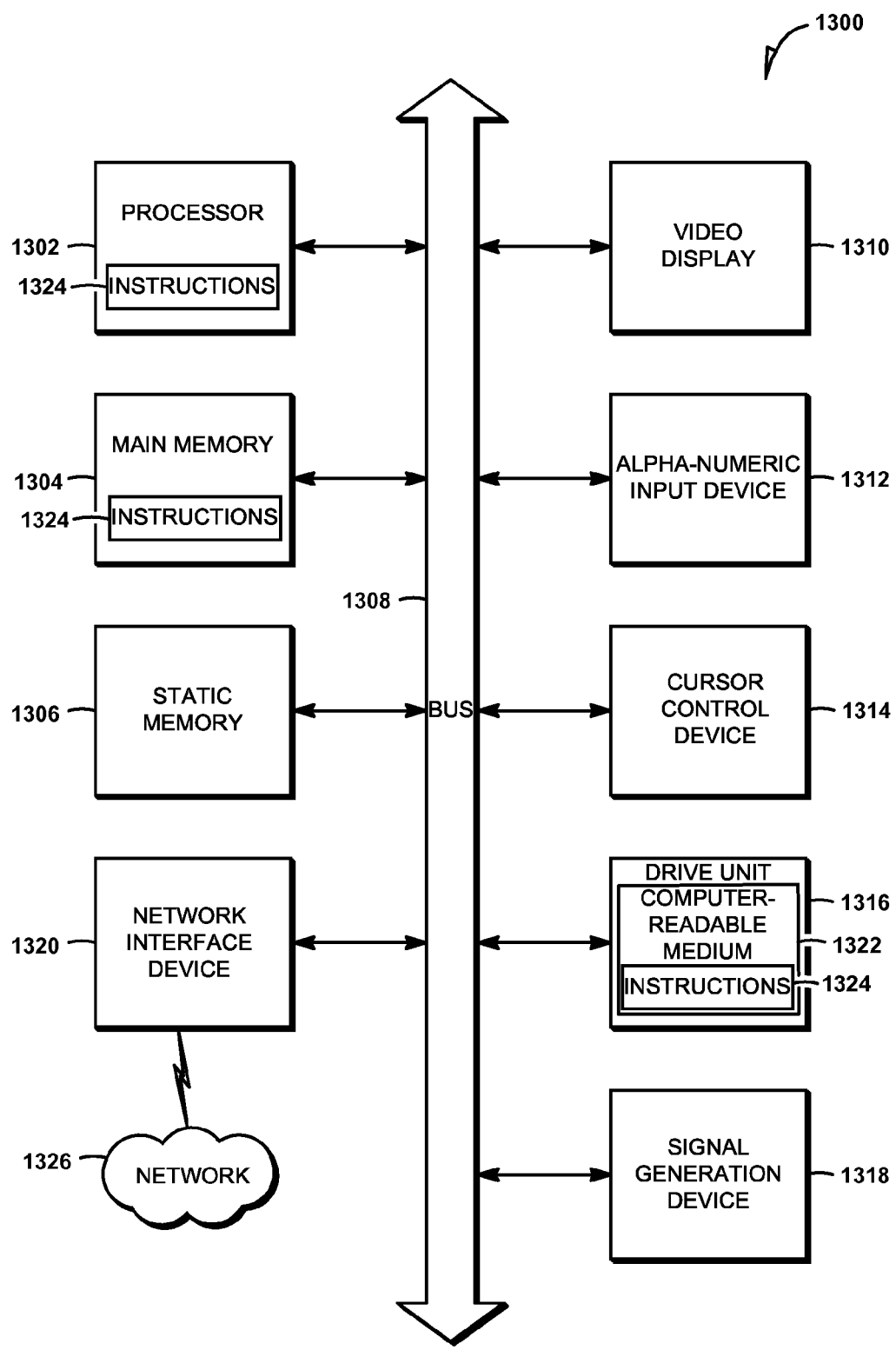
FIG. 13 is a diagram schematically illustrating the computer system.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The present invention comprises a system 100 for dividing assets or issues between two or more parties, the system comprising a catalog module 202 configured to receive an inventory of assets and their corresponding values 302, a survey module 204 configured to determine the parties time constraints, monetary interest, and emotional interest in the assets 304, a bidding module 206 configured to determine the results of the division 306; a post-bidding module 208 configured to finalize the results of the division 308; and a storage device 126 configured to store the results 128 of the catalog module 202, survey module 204, bidding module 206, and post bidding module 208. The present invention incorporates these modules to fairly divide as, envy-free as possible, the assets or issues of an estate, defined for our purposes as real property (home, home furnishing, personal belongings, asset accounts, vehicles, business assets, etc) or conflicts (visitation dates, chores, hours, etc).

While the present invention is intended to be fully automated, a moderator can govern the system and assist in conflict resolution. The moderator is either an automated process in the system 100, or a user designated to control the process. Oftentimes, the moderator is the executor of an estate. Alternatively, the moderator may be an attorney or other professional arbitrator. Any conflicts that are unforeseen can be resolved by the moderator in this manner.

An invitation, registration, and login system is implemented to authenticate users. The moderator will invite the appropriate parties to the system 100. They will be required to register with the system 100, and they will use their login credentials to enter the system 100 and have access hidden to all other involved parties as they select. A contractual agreement may be included during the registration process explaining the legal rights of the parties with respect to the division results and terms of use policy.

The catalog module 202 allows the moderator to enter data into the system 100. This data includes all items of an estate. An asset list is populated with common assets 402, asset description, asset photos 404, monetary value for each asset 406, interest Boolean value, contested Boolean value, total asset value, total number of assets, total number of parties, percentage value, and type of division are common entries. Typically, the type of division is received, a total number of parties is received, a percentage value is received for each party, each asset is received or selected from the asset list such as property, days, or visitation 402, an asset description is received or selected from the asset list for each asset, an asset photo may be received or selected from the asset list for each asset 404, a monetary value is received for each asset 406, a total number of assets and total asset value is calculated 408, and a value is assigned to the interest and contested Boolean values for each asset. The moderator will implement all of these changes into the catalog.

A spreadsheet layout is implemented for ease in entering data. Furthermore, an asset or issue list can be implemented, including drop-down lists of items most commonly included in an estate. For example, if a home is included, the drop-down list may divide the home by rooms and include common furniture, appliances, and electronics that may be in the rooms. Those may be edited or added to in any way by the moderator to more accurately reflect the assets being divided in each instance. All information is incorporated into the database and access is restricted to the moderator.

According to some advantageous embodiments of the present invention, the virtual indicia of each of the items being divided by the parties may comprise, for example, a photo image and description or other virtual reproduction of the item for easy reference. It may further include more comprehensive details found via a link or links within the listing, such as an appraisal or video.

The survey module 204 allows the system 100 to gather relevant information from the parties. Each participant begins by completing the short blind, anonymous questionnaire or survey. The questions may be completed by a third party such as an attorney, executor of an estate, or administrator. Most commonly, though, the involved devisees will answer the questions. By having the individual parties complete the questionnaire, the system is better able to recommend paths of equitable distribution or conflict resolution best suited to that division. At the same time, getting to answer the questionnaire gives a voice to each participant, reducing their anxiety over not being in charge and helps reduce concerns about the process, leading to more envy-free divisions. These third parties may also help set the guidelines prior to beginning.

These questions will be populated by the moderator according to the estate type and information sought to be gathered 502. Questions might include: Is this division related to a downsizing or death? Is this an asset split after a divorce? What is the level of conflict expectation? How many items do you have strong emotional ties to? Are the parties generally contentious with one another or wanting everyone to get what they want if possible? Question responses are retained for historical data reference for the system to improve its accuracy. The system 100 receives the answers to the questions 506. The length of division, monetary interest in the assets, emotional interest in the assets, and starting round are calculated 510 from the answers to the questions combined with empirical data such as the number of parties in the division, the reason for the division, the monetary values involved, and the number of items.

The questionnaire will also contain an asset list for the parties to review and approve 504. Commonly, the parties will view the asset list and approve. However, if they feel that an item should be included, such as an item that is missing from the estate, they can request that it be added to the asset list. Conversely, if they feel that an item should be removed, they can request that it be removed from the asset list 508. The moderator can then determine the validity of the change and modify the asset list according to the party's wishes, or place contested items to the side to move forward with a division of approved assets The bidding module 206 includes five rounds of bidding. The first round 210 is intended to gather interest in items. The second round 212 is intended to reach an agreed monetary value for the items. The third round 214 is only used if emotional interest is found 602 in any items in the estate. The fourth round 216 uses real currency, and is only used for contested items 604. The fifth round 218 contains all remaining items which are distributed by selection.

The system 100 implements a first round engine 210 to determine each party's interest in an asset 702. Here, each party submits 704 to each asset a "not interested" value or an "interested value" 706. All assets that receive a "not interested" value 708 will be sold or donated 710 and the proceeds of the sale added to the total asset value. The first round engine 210 ends and moves to the second round engine 712.

The system 100 implements a second round engine 212 to determine the monetary value of interested assets. Oftentimes, parties will not be in agreement as to the value of certain items in an estate. For example, if a party feels that an item has been appraised incorrectly, or otherwise feels an item's listed monetary value is incorrect, they will have the opportunity to express that here. Each party can either accept the listed monetary value 802, suggest a new value, or request a new appraisal 804. The system will assign a contested value to all assets whose monetary value is not in agreement 808 and an uncontested value to all assets whose monetary value is in agreement 806. Alternatively, the parties may have little or no interest in the monetary value of items, in which case a de minimis value will be the default monetary value and the division will be directed to non monetary bidding and selection methods. The second round 212 engine ends and moves to the third round engine 214.

The system 100 implements a third round engine 214 to distribute uncontested assets using a bidding system. The third round engine is only used when at least one party expresses an emotional interest in an asset 602 during the survey module 204. Each party receives emotional currency according to their percentage value 902. The emotional currency is the value primarily used to determine which party gets which items that carry an emotional charge. This emotional currency is used to bid on assets 904. If, after the bidding, an asset results with no emotional currency bid or a tied emotional currency bid 906, that asset is assigned a contested value 908. Otherwise, the winning bidder will receive the asset, and their emotional currency will be deducted by the winning bid 910. The third round will repeat until emotional currency is depleted 912. Alternatively, additional emotional currency may be awarded to the participants of subsequent rounds based on their pro rata share of the estate, remaining amount from the previous round, amount of assets won and remaining, or any other means, and bidding will continue until no uncontested items remain. The third round 214 engine ends and moves to the fourth round engine 216.

The third round 214 engine may incorporate any number of bidding systems. Blind bidding provides for a round of bids that are submitted by each party and compared to alternate bids. The asset is awarded to the party with the highest bid submitted. Live auction bidding provides for a fixed time period of availability for parties to enter and see counter bids on each item with the winner declared as the highest value entered before time expires. Round robin bidding provides for biding rounds with predetermined time constraints. After a bidding round ends, a total bid is calculated and displayed to all parties. Each party can then make a new higher bid in a subsequent round until no more bids are received. Sealed blind bidding provides sealed bids to be submitted establishing a total value each party is willing to pay for each item of interest. If the winning bid is the highest bid, that party will win the asset at that bid amount.

The system 100 implements a fourth round engine 216 to distribute contested assets using a balanced blind bidding system. Here, each party can submit a bid on assets with real currency 1002, much like in any typical live auction. This bid will represent an amount that they are both happy to be the seller for at that higher amount or the buyer for at that bid amount. Oftentimes, emotions may cause the winning bidder to overextend themselves and bid too high, or the competing bidder may strategically bid too low. As such, the winning bid will be capped by a percent of the next highest bid 1004 before assigning the asset to the winning bidder 1006, ensuring that both parties bid honestly and the result is fair and envy-free. For example, if the system incorporates a 20% cap, the highest bid will be compared to the next highest bid, and if it is more than 20% higher than the next highest bid, it will be reduced to that amount. The total asset value will be updated 1008 to reflect the new monetary values of the winning bids. The fourth round 216 engine ends and moves to the fifth round engine 218.

The system 100 implements a fifth round engine 218 to distribute all remaining assets. This round will not incorporate any types of bidding. Instead, this round will incorporate selection to assign the assets of the estate 1102. A value and choose method involves the selecting party indicating their choices from among the assets valued by the first party until his sum total of those assets' values equals his designated share. A divide and choose method involves the selecting party creating two lists representing their desired share of the assets, comparing their list to the other party's list, and dividing the estate accordingly. Alternating selection involves each party making a selection of one or more items from the asset list or subset of the asset list. After making a selection, the next party will have an opportunity to make a selection from the remaining items. This continues and repeats until all items are divided. Weighted alternating selection is similar to alternating selection, but with a reversed order after all parties have selected. Lastly, any other fair division method, such as all parties dividing the assets and taking their selection, can be used. If all else fails, a coin flip may be used to settle disputes.

After all assets are divided, a post-bidding module 208 will be implemented. This module will disclose the results of the division to all parties 1202, wherein the parties are given the opportunity to barter their assets between each other through the system or moderator 1204. After all assests are bartered, the total value of each party's assets are calculated for each party 1206 and a final list is created. Each party is required to pay to the other parties the difference between the total value of their distributed assets and their pro rata share of the newly established final value of the total estate, including their own portion 1208. For example, a party bidding an amount significantly higher than the originally agreed market value, or winning many items at higher monetary value than the others were willing to pay, boosts the overall value of the estate for all, including the high bidder.

An alternate embodiment of the present invention comprises a method of allowing an estate owner to invite would-be heirs to indicate their interest in items through emotional bidding or other selection methods as a way of collaborative estate planning to reduce conflicts and ambiguity arising after a death or when allocating an estate in downsizing or estate planning.

In yet another alternate embodiment of the invention, a law firm, therapist, appraiser, estate planning firm, or other professional service provider is able to make these services available in their brand, co-branded as an additional service or a service they can assist in for additional fees.

Still further embodiments of the present invention comprise systems for implementing the associated methods of on-line listing and asset selection as described herein. Such systems may be implemented in computer software, or a combination of computer software and hardware, having one or more processing portions for accomplishing the associated methods of embodiments of the present invention.

One useful embodiment of the systems of the invention is the ease of implementation for a participating professional service provider. All that is required to offer the service in one embodiment is adding a link on the provider's website. This process may include the merchant's computer and invention's computer as the central computer, or computer device that is a part of a larger computer network such as, for example, the Internet. Such a central computer or computer device may comprise, for example, a desktop personal computer, a laptop personal computer, a smart phone, a server, a router, a mainframe computer, or like devices or combinations thereof capable of implementing the described functions as known to one skilled in the art. Once established on the central computer or computer device, the on-line entity is accessible to a sender through a sender's computer and to a recipient through a recipient's computer, with each of the computers being an integral part of the computer network and communicable with the central computer or computer device through, for example, network communication lines.

The on-line asset listing is generally implemented in computer software, though the on-line entity may also, in some cases, be implemented by a combination of software and hardware. The created asset list and associated support photos, appraisals and other reference are generally stored in, for example, respective databases in a memory device incorporated within or otherwise associated with the central computer or computer device. Further, the shopping cart, the notification center, the payment center, and the asset listing tools are typically implemented in software, though these components may be implemented by a combination of software and hardware in some instances. For example, the notification center may include or be disposed in communication with a router, server, switch, or the like for appropriately directing both outgoing and incoming messages. In addition, the configuration confirmation unit may be, for instance, a display or other mechanism for presenting text, graphics, or the like to the participant to confirm the authenticity, while the asset division methods are generally implemented in software, sometimes in conjunction with an audio and/or video recording and playback mechanism or the like. These elements thus form a system having one or more processing portions for implementing the associated methods according to embodiments of the present invention.

In an alternate embodiment, cumulative intelligence may assist in dividing the assets among parties. The computer program will utilize cumulative intelligence to recommending the smoothest path to resolution based on the data and profiles of prior users eventually. The system's "intelligence" will grow as it logs, analyzes and adjusts recommendations to users that are most likely to work, based on similar client use in the past. In addition, historical data will be used to create statistical norms and user profiles of the service. This will be accomplished through data gathered prior to beginning from the users, recording the activities throughout the process, and exit questionnaires of the users. This data will become invaluable at adding relevance to the system and value to its users.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A system for dividing assets between two or more parties, the system comprising:
    a catalog module configured to receive an inventory of assets and their corresponding values;
    a survey module configured to determine the parties time constraints, monetary interest, and emotional interest in the assets;
    a bidding module configured to determine the results of the division;
    a post-bidding module configured to finalize the results of the division; and
    a storage device configured to store the results of the catalog module, survey module, bidding module, and post bidding module;
    the bidding module further comprising:
    a first round engine configured to determine each party's interest in an asset, wherein each party submits to each asset a not interested value or an interested value, all assets receiving a not interested value being sold or donated and the proceeds of the sale added to the total asset value;
    a second round engine configured to determine the monetary value of interested assets, wherein each party accepts the listed monetary value or either requests a new appraisal or submits a bid to increase the monetary value of each asset, the system assigning to each asset a contested value to all assets whose monetary value is not in agreement and an uncontested value to all assets whose monetary value is in agreement;
    a third round engine configured to distribute uncontested assets using a bidding system when at least one party disclosed an emotional interest in an asset, wherein each party receives emotional currency according to their percentage value, each party submits a bid on assets with emotional currency, all assets with no emotional currency bid or tied emotional currency bids being assigned a contested value, all winning bids being deducted from the party's emotional currency, wherein the third round will repeat until emotional currency is depleted, wherein emotional currency is the value used to determine which party gets items what carry an emotional charge;
    a fourth round engine configured to distribute contested assets using a balanced blind bidding system, wherein each party submits a bid on assets with real currency, the winning bid being capped by a percent of the next highest bid, the total asset value updated to reflect the new value; and
    a fifth round engine configured to distribute all remaining assets by selection.

2. The system of claim 1, the catalog module further comprising:
    an asset list populated with common assets;
    an asset description;
    an asset photo;
    an monetary value for each asset;
    an interest Boolean value;
    a contested Boolean value;
    a total asset value;
    a total number of assets;
    a total number of parties;
    a percentage value; and
    the type of division;
    wherein a type of division is received, a total number of parties is received, a percentage value is received for each party, each asset is received or selected from the asset list such as property, days, or visitation, an asset description is received or selected from the asset list for each asset, an asset photo may be received or selected from the asset list for each asset, a monetary value is received for each asset, a total number of assets is calculated, a total asset value is calculated, and a value is assigned to the interest and contested Boolean values for each asset.

3. The system of claim 2, the survey module further comprising:
    populating a questionnaire with questions to determine the parties desired length of division, monetary interest in the assets, and emotional interest in the assets;
    distributing an asset list for approval;
    receiving answers to the questionnaire;
    receiving approval, addition or removal of assets in asset list; and
    calculating the preferred time and method of the division according to the answers.

4. The system of claim 1, wherein bidding systems comprise:
    blind bidding;
    live auction bidding;
    round robin bidding; or
    sealed blind bidding.

5. The system of claim 4, wherein selection comprises:
    value and choose selection;
    divide and choose selection;
    alternating selection;
    weighted alternating selection;
    fair division; or
    coin flip.

6. The system of claim 5, the post-bidding module further comprising:
    disclosing the results of the bidding to all parties, wherein the parties are given the opportunity to barter their assets; and
    calculating the total value of each party's distributed assets, wherein each party is required to pay the difference between the total value of their distributed assets and their percentage value of the updated final value to the remaining party members.

7. A processor-implemented method for dividing assets between two or more parties on a non-transitory subject matter, the method comprising:
    electronically receiving an inventory of assets and their corresponding values at a catalog module on a non-transitory processor;
    electronically determining the parties time constraints, monetary interest, and emotional interest in the assets at a survey module on a non-transitory processor;
    electronically determining the results of the division at a bidding module on a non-transitory processor;
    electronically finalizing the results of the division at a post-bidding module on a non-transitory processor; and storing the results of the catalog module, survey module, bidding module, and post bidding module on a non-transitory storage device;

the bidding module further comprising:

a first round method to determine each party's interest in an asset, wherein each party submits to each asset a not interested value or an interested value, all assets receiving a not interested value being sold or donated and the proceeds of the sale added to the total asset value;

a second round method to determine the monetary value of interested assets, wherein each party accepts the listed monetary value or either requests a new appraisal or submits a bid to increase the monetary value of each asset, the system assigning to each asset a contested value to all assets whose monetary value is not in agreement and an uncontested value to all assets whose monetary value is in agreement;

a third round method to distribute uncontested assets using a bidding system when at least one party disclosed an emotional interest in an asset, wherein each party receives emotional currency according to their percentage value, each party submits a bid on assets with emotional currency, all assets with no emotional currency bid or tied emotional currency bids being assigned a contested value, all winning bids being deducted from the party's emotional currency, wherein the third round will repeat until emotional currency is depleted;

a fourth round method to distribute contested assets using a balanced blind bidding system, wherein each party submits a bid on assets with real currency, the winning bid being capped by a percent of the next highest bid, the total asset value updated to reflect the new value; and a fifth round method to distribute all remaining assets by selection.

8. The method of claim 7, the catalog module further comprising:

an asset list populated with common assets;
an asset description;
an asset photo;
an appraisal value for each asset;
an interest Boolean value;
a contested Boolean value;
a total asset value;
a total number of assets;
a total number of parties;
a percentage value; and
the type of division;

wherein a type of division is received, a total number of parties is received, a percentage value is received for each party, each asset is received or selected from the asset list such as property, days, or visitation, an asset description is received or selected from the asset list for each asset, an asset photo may be received or selected from the asset list for each asset, a monetary value is received for each asset, a total number of assets is calculated, a total asset value is calculated, and a value is assigned to the interest and contested Boolean values for each asset.

9. The method of claim 8, the survey module further comprising:

populating a questionnaire with questions to determine the parties desired length of division, monetary interest in the assets, and emotional interest in the assets;
distributing an asset list for approval;
receiving answers to the questionnaire;
receiving approval, addition or removal of assets in asset list; and calculating the preferred time and method of the division according to the answers.

10. The method of claim 9, wherein bidding systems comprise:

blind bidding;
live auction bidding;
round robin bidding; or
sealed blind bidding.

11. The method of claim 10, wherein selection comprises:

value and choose selection;
divide and choose selection;
alternating selection;
weighted alternating selection;
fair division; or
coin flip.

12. The method of claim 11, the post-bidding module further comprising:

disclosing the results of the bidding to all parties, wherein the parties are given the opportunity to barter their assets; and calculating the total value of each party's distributed assets, wherein each party is required to pay the difference between the total value of their distributed assets and their percentage value of the updated final value to the remaining party members.

13. A non-transitory computer-readable storage medium storing a set of instructions that, when executed by a processor, cause the processor to perform operations, comprising:

receiving an inventory of assets and their corresponding values at a catalog module;
determining the parties time constraints, monetary interest, and emotional interest in the assets at a survey module;
determining the results of the division at a bidding module;
finalizing the results of the division at a post-bidding module; and
storing the results of the catalog module, survey module, bidding module, and post bidding module on a storage device;

the bidding module further comprising:

a first round method to determine each party's interest in an asset, wherein each party submits to each asset a not interested value or an interested value, all assets receiving a not interested value being sold or donated and the proceeds of the sale added to the total asset value;

a second round method to determine the monetary value of interested assets, wherein each party accepts the listed monetary value or either requests a new appraisal or submits a bid to increase the monetary value of each asset, the system assigning to each asset a contested value to all assets whose monetary value is not in agreement and an uncontested value to all assets whose monetary value is in agreement;

a third round method to distribute uncontested assets using a bidding system when at least one party disclosed an emotional interest in an asset, wherein each party receives emotional currency according to their percentage value, each party submits a bid on assets with emotional currency, all assets with no emotional currency bid or tied emotional currency bids being assigned a contested value, all winning bids being deducted from the party's emotional currency, wherein the third round will repeat until emotional currency is depleted;

a fourth round method to distribute contested assets using a balanced blind bidding system, wherein each party submits a bid on assets with real currency, the winning bid being capped by a percent of the next highest bid, the total asset value updated to reflect the new value; and a fifth round method to distribute all remaining assets by selection.

\* \* \* \* \*